(12) United States Patent
Dinerstein et al.

(10) Patent No.: US 8,316,028 B2
(45) Date of Patent: Nov. 20, 2012

(54) BIOMETRIC INDEXING AND SEARCHING SYSTEM

(75) Inventors: Jonathan J Dinerstein, Draper, UT (US); Brian H Rosenlof, Eagle Mountain, UT (US); Christopher Case, Herriman, UT (US); Sabra A Dinerstein, Lehi, UT (US)

(73) Assignee: Lockheed Martin Corporation, Bethesda, MD (US)

( * ) Notice: Subject to any disclaimer, the term of this patent is extended or adjusted under 35 U.S.C. 154(b) by 84 days.

(21) Appl. No.: 12/889,943

(22) Filed: Sep. 24, 2010

(65) Prior Publication Data

US 2012/0078886 A1    Mar. 29, 2012

(51) Int. Cl.
*G06F 17/30*    (2006.01)

(52) U.S. Cl. ......... 707/741; 707/723; 713/186; 382/115

(58) Field of Classification Search .................. 707/723, 707/741; 713/186
See application file for complete search history.

(56) References Cited

U.S. PATENT DOCUMENTS

| | | | |
|---|---|---|---|
| 6,941,003 | B2 | 9/2005 | Ziesig |
| 7,225,338 | B2 | 5/2007 | Khan et al. |
| 7,415,456 | B2 | 8/2008 | Benco et al. |
| 2004/0213437 | A1* | 10/2004 | Howard et al. ............ 382/115 |
| 2007/0172114 | A1 | 7/2007 | Baker et al. |
| 2007/0253608 | A1 | 11/2007 | Tulyakov et al. |
| 2008/0172729 | A1 | 7/2008 | Takamizawa et al. |
| 2009/0174526 | A1 | 7/2009 | Howard et al. |
| 2010/0027852 | A1 | 2/2010 | Hsieh et al. |
| 2010/0039223 | A1 | 2/2010 | Siedlarz |
| 2010/0161654 | A1 | 6/2010 | Levy |

OTHER PUBLICATIONS

Mhatre et al., Efficient Search and Retrieval in Biometric Databases, 2005, Univ. of Buffalo, Proceedings of the SPIE, vol. 5779, pp. 265-273 (2005).*
A. Gyaourova et al., A Novel Coding Scheme for Indexing Fingerprint Patterns, Proceedings of S+SSPR Workshop, LNCS 5342, pp. 765-774, (Orlando, USA), Dec. 2008.
A. Gyaourova et al., A Coding Scheme for Indexing Multimodal Biometric Databases, The Institute of Electrical and Electronics Engineers, Inc., 2009.
A. Mhatre et al., Efficient Search and Retrieval in Biometric Databases, Center for Unified Biometrics and Sensors, University at Buffalo, NY, Mar. 2005.
A. Mhatre et al., Indexing Biometric Databases using Pyramid Technique, Center for Unified Biometrics and Sensors, University at Buffalo, NY, 2005.
L. Yu et al., Coarse Iris Classification using Box-Counting to Estimate Fractal Dimensions, The Journal of the Pattern Recognition Society, Pattern Recognition 38 (2005) 1791-1798.
X. Qiu et al., Coarse Iris Classification by Learned Visual Dictionary, Center for Biometrics and Security Research, National Laboratory of Pattern Recognition, Institute of Automation, Chinese Academy of Sciences, P.R. China, 2007.

* cited by examiner

*Primary Examiner* — Neveen Abel Jalil
*Assistant Examiner* — Jagdish Pandya
(74) *Attorney, Agent, or Firm* — Oliff & Berridge, PLC

(57) ABSTRACT

A prototype biometric identification system is disclosed that indexes a biometric corpus into indexed-corpuses using a set of P prototypes before searching for a probe in a search corpus constructed based on the indexed-corpus. The system may index the biometric corpus based on the prototypes directly or based on prototype-typicality scores.

12 Claims, 16 Drawing Sheets

BIOMETRIC INDEXING AND SEARCHING SYSTEM

BACKGROUND

Biometric data is available for people identification. Large databases of biometric data such as FBI's Integrated Automated Fingerprint Identification System (IAFIS) are available. Databases containing modalities other than fingerprints such as for retina scans, etc. are also available and stored in large biometric corpuses. When biometric data is captured for a person of interest, biometric corpuses may be searched using the captured biometric data as a probe to ascertain if the person is in the biometric corpus. If found, the person may be better identified by additional information collected in the biometric corpus.

SUMMARY

A biometric identification system (system) is disclosed that indexes a biometric corpus into indexed-corpuses based on a set of P prototypes before searching for a probe in one of the indexed-corpuses. The prototypes may be randomly selected and need not be in the biometric corpus.

In one embodiment, the system indexes the biometric corpus based directly on the prototypes. Templates in the biometric corpus are compared to each of the prototypes using a matching operation to obtain template-match scores. For each prototype, templates corresponding to top M1 template-match scores are placed in a prototype corpus resulting in P prototype corpuses.

Prior to searching, the system constructs a search corpus by performing the matching operation between the probe and each of the prototype corpuses to generate probe-match scores. Templates in prototype corpuses corresponding to top M2 probe-match scores are placed in a search corpus. The system performs the matching operation between the probe and templates in the search corpus to generate candidate-match scores. Templates corresponding to top M3 candidate-match scores are selected to be identity candidates.

In another embodiment, the system indexes the biometric corpus based on a typicality score. Typicality is an average of match scores. The templates in the biometric corpus are matched against the prototypes, and a typicality processor generates template-typicality scores. An index processor generates a typicality-indexed corpus by indexing the biometric corpus based on ranges of the template-typicality scores where each typicality range corresponds to a sub-corpus of the typicality-indexed corpus. A search processor constructs a search corpus by selecting a sub-corpus of the typicality-indexed corpus based on a probe-typicality score.

In a further embodiment, the system indexes the biometric corpus based on axes of an S dimensional hyperspace constructed based on prototype-typicality scores. A set of S probe-typicality scores are generate that address a hypercube of the biometric corpus that is used as the search corpus.

Identity candidates are generated by the above search techniques for a single modality. When multiple modalities are available, identity candidates are generated for each of the modalities. Identity candidates of the different modalities are fused together to generate fused identity candidates.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
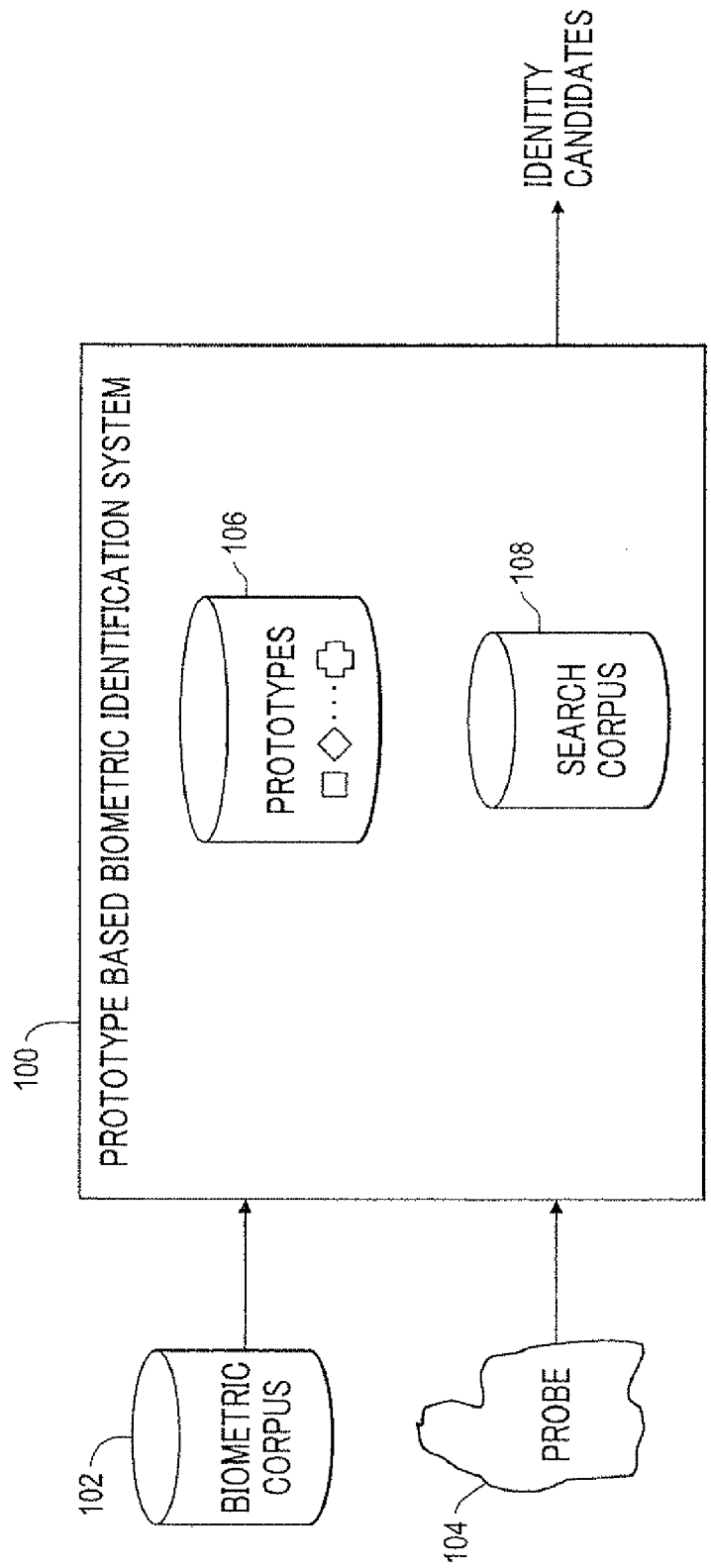
FIG. 1 illustrates a prototyped based biometric identification system.

FIG. 1 shows an exemplary diagram of a prototyped based biometric identification processor 100 (herein after referred to as biometric processor 100) that searches for a probe 104 in a biometric corpus 102 containing templates of biometric data to obtain identity candidates for probe 104. Biometric processor 100 is modality independent and can be applied to any type of biometric modalities such as fingerprints, retina scans, etc. Biometric processor 100 does not provide any matching functions, but performs a matching operation using a matching function that is provided for a particular modality. Where multiple modalities are present for probe 104, biometric processor 100 indexes and searches biometric corpus 102 for each modality independently and fuses resulting identity candidates for the modalities using a bank of kernel processors to generate fused identity candidates.

Instead of searching biometric corpus 102 directly, biometric processor 100 reduces a number of templates of biometric corpus 102 to be searched by constructing a search corpus 108 based on a set of P prototype templates (prototypes) 106, and searching only search corpus 108. Biometric corpus 102 is first indexed based on prototypes 106. Search corpus 108 is constructed by extracting a portion of the indexed biometric corpus thus reducing a number of templates in search corpus 108 and consequently, reducing a search time for probe 104. Indexing biometric corpus 102 is probe independent and can be performed before searching for probe 104.

Although not necessary, it is desirable for prototypes 106 to represent a maximum variety of possible templates. Prototypes 106 may be selected randomly by taking first N templates from biometric corpus 102, for example. Prototypes may be obtained from sources other than biometric corpus 102. However, synthesized templates are not preferred because these may adversely influence indexing of biometric corpus 102 and selection of templates for the search corpus.

Figure 2:
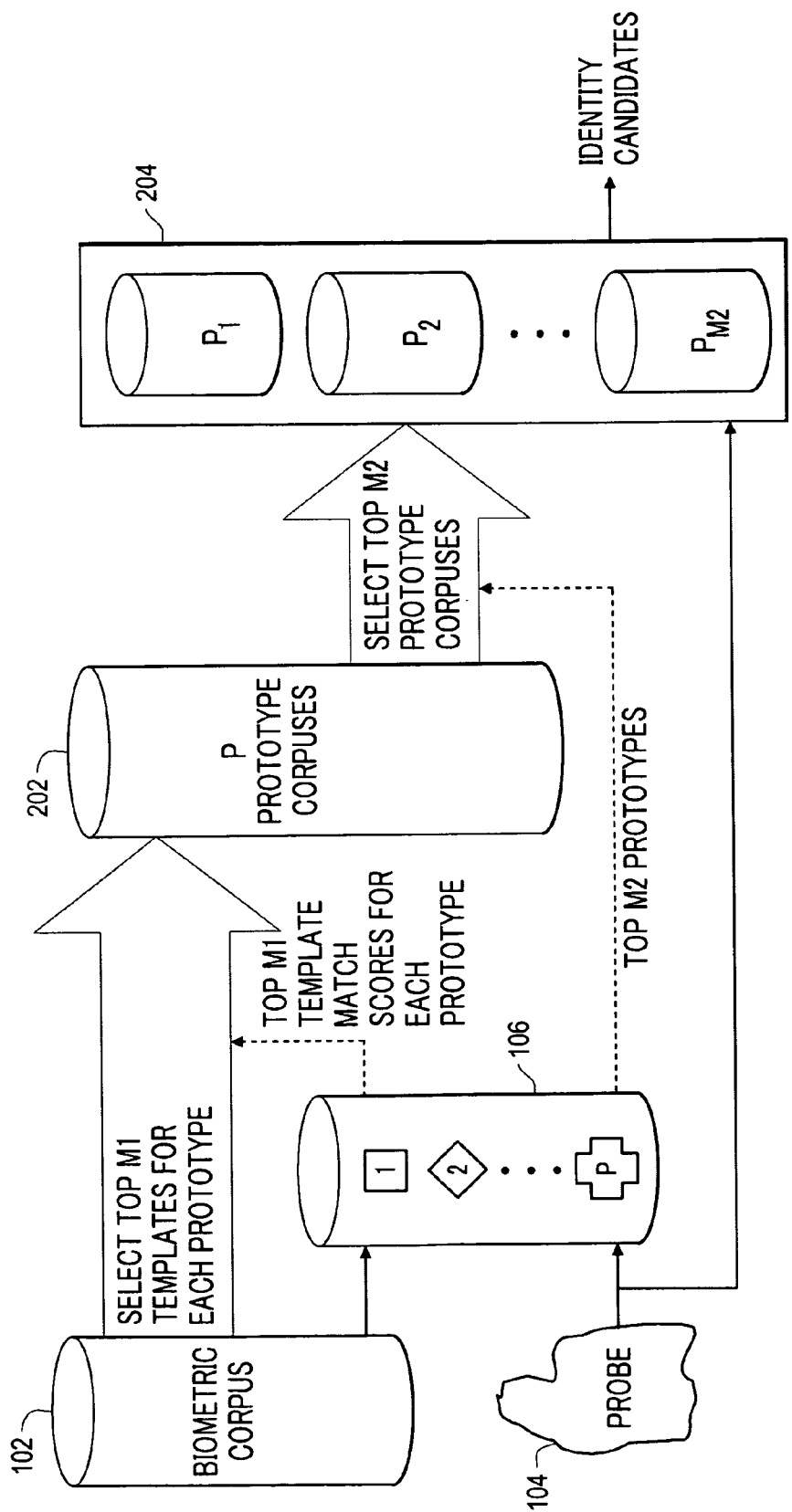
FIG. 2 illustrates biometric identification based on prototype matching.

In FIG. 2, biometric processor 100 indexes biometric corpus 102 by performing a matching operation between each of prototypes 106 and all templates in biometric corpus 102. For each of prototypes 106, biometric processor 100 selects templates having top M1 match scores to form a prototype-indexed corpus 202 comprising P prototype corpuses. Thus, biometric processor 100 indexes biometric corpus 102 according to prototypes 106 to obtain prototype-indexed corpus 202.

Prior to searching, biometric processor 100 constructs a search corpus 204 by performing the matching operation between probe 104 and prototypes 106 to obtain probe-match scores. Biometric processor 100 selects ones of the prototype corpuses in prototype-indexed corpus 202 that correspond to prototypes having top M2 probe-match scores to form search corpus 204. Finally, probe 104 is matched against templates in search corpus 204 to obtain candidate-match scores. Templates that correspond to top M3 candidate-match scores are selected as identity candidates. If biometric data of probe 104 for multiple modalities are available, then the above process is performed for each of the modalities. The bank of kernel processors fuses the identity candidates for all the modalities to obtain fused identity candidates.

Figure 3:
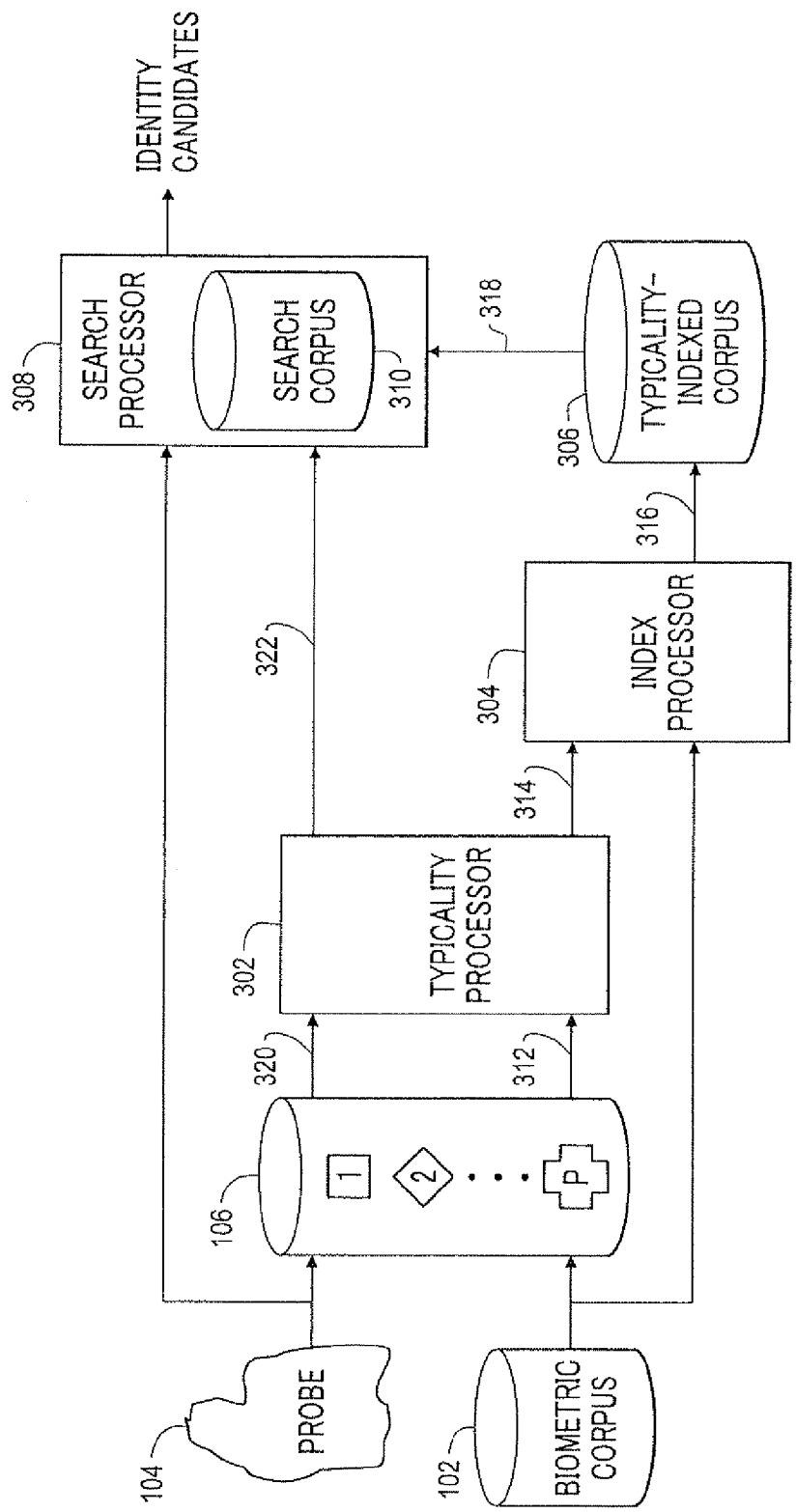
FIG. 3 illustrates biometric corpus indexing and searching based on template-typicality scores.

In FIG. 3, biometric processor 100 indexes biometric corpus 102 based on typicality scores instead of match scores. A typicality score is an average of match scores. Biometric processor 100 performs the matching operation between each of the templates in biometric corpus 102 and all the prototypes 106 obtaining P template-match scores for each template. A typicality processor 302 of biometric processor 100 receives the P template-match scores, as represented by arrow 312, and averages the P match scores to generate a template-typicality score for each of the templates. Typicality processor 302 sends the template-typicality scores for all the templates to an index processor 304 of biometric processor 100, as represented by arrow 314. Index processor 304 indexes biometric corpus 102 based on the template-typicality scores for all the templates in biometric corpus 102 to generate a typicality-indexed corpus 306, as represented by arrow 316.

Figure 4:
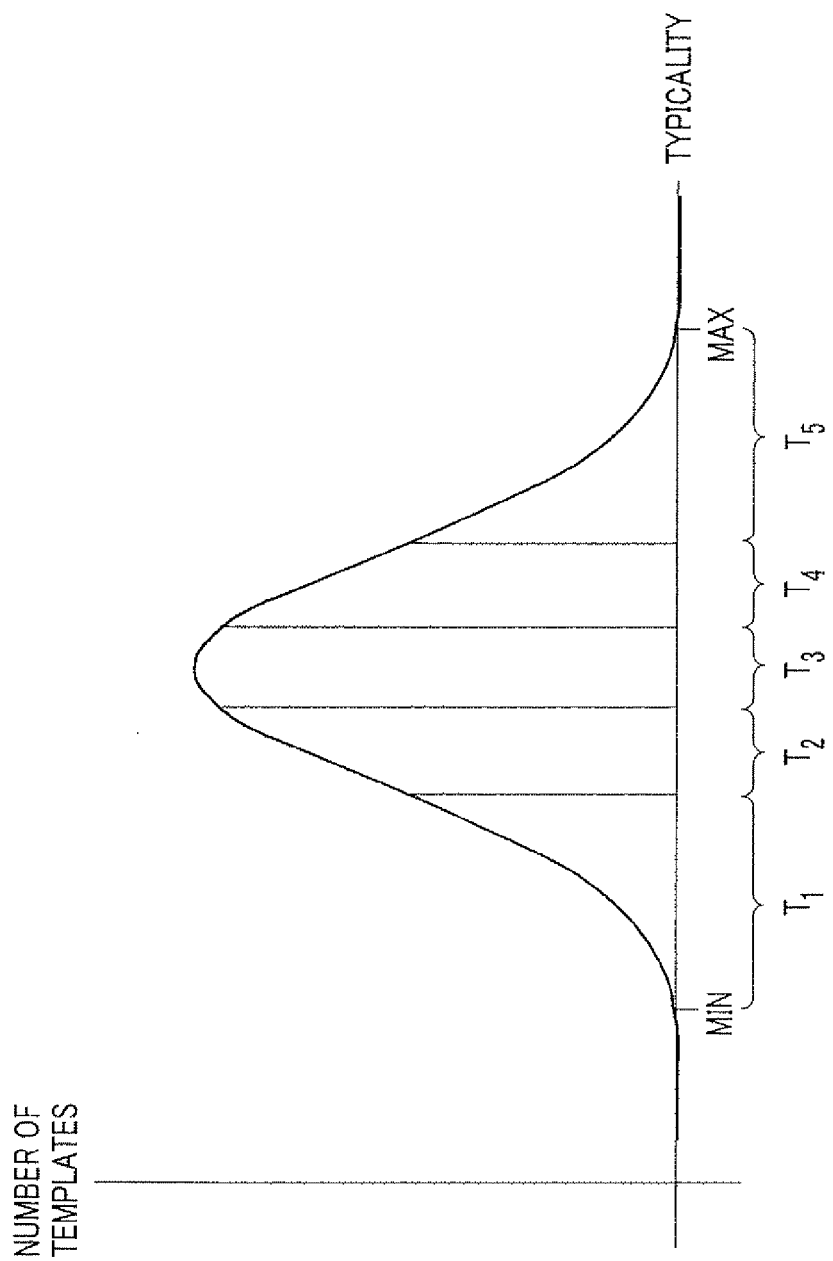
FIG. 4 illustrates a typicality distribution.

In general, index processor 304 divides biometric corpus 102 into approximately equal sized typicality-indexed sub-corpuses and index the typicality-indexed sub-corpuses by a typicality range. Usually, typically scores for randomly selected prototypes 106 forms a Gaussian bell curve. In FIG. 4, for example, typicality scores ranges between a min value and a max value. If the templates are divided into 5 typicality-indexed sub-corpuses from $T_1$ to $T_5$, then the typicality range for each of the typicality-indexed sub-corpuses are selected to have approximately a same number of templates. All of the typicality-indexed sub-corpuses form a typicality-indexed corpus 306.

Because the above processes are performed without any information regarding probe 104, typicality-indexed corpus 306 may be constructed once prior to any process associated with probe 104. Thereafter, typicality-indexed corpus 306 can be used to search for identity candidates for any number of probes 104.

Prior to searching for probe 104, a search processor 308 of biometric processor 100 constructs a search corpus 310 based on a probe-typicality score of probe 104 relative to prototypes 106. Biometric processor 100 first performs the matching operation between probe 104 and prototypes 106. The resulting P probe-match scores are sent to typicality processor 302 (arrow 320) that averages all the P probe-match scores to generate a probe-typicality score for probe 104. Search processor 308 receives the probe-typicality score (arrow 322) and extracts a typicality-indexed sub-corpus (arrow 318) whose corresponding typicality range encompasses the probe-typicality score of probe 104 to form search corpus 310. Biometric processor 100 performs the matching operation between probe 104 and the search corpus 310 to obtain candidate-match scores, and search processor 308 selects templates corresponding to top M3 candidate-match scores to generate identity candidates for probe 104. If a more inclusive search is desired, typicality-indexed sub-corpuses of adjacent typicality ranges may be added to search corpus 310.

Figure 5:
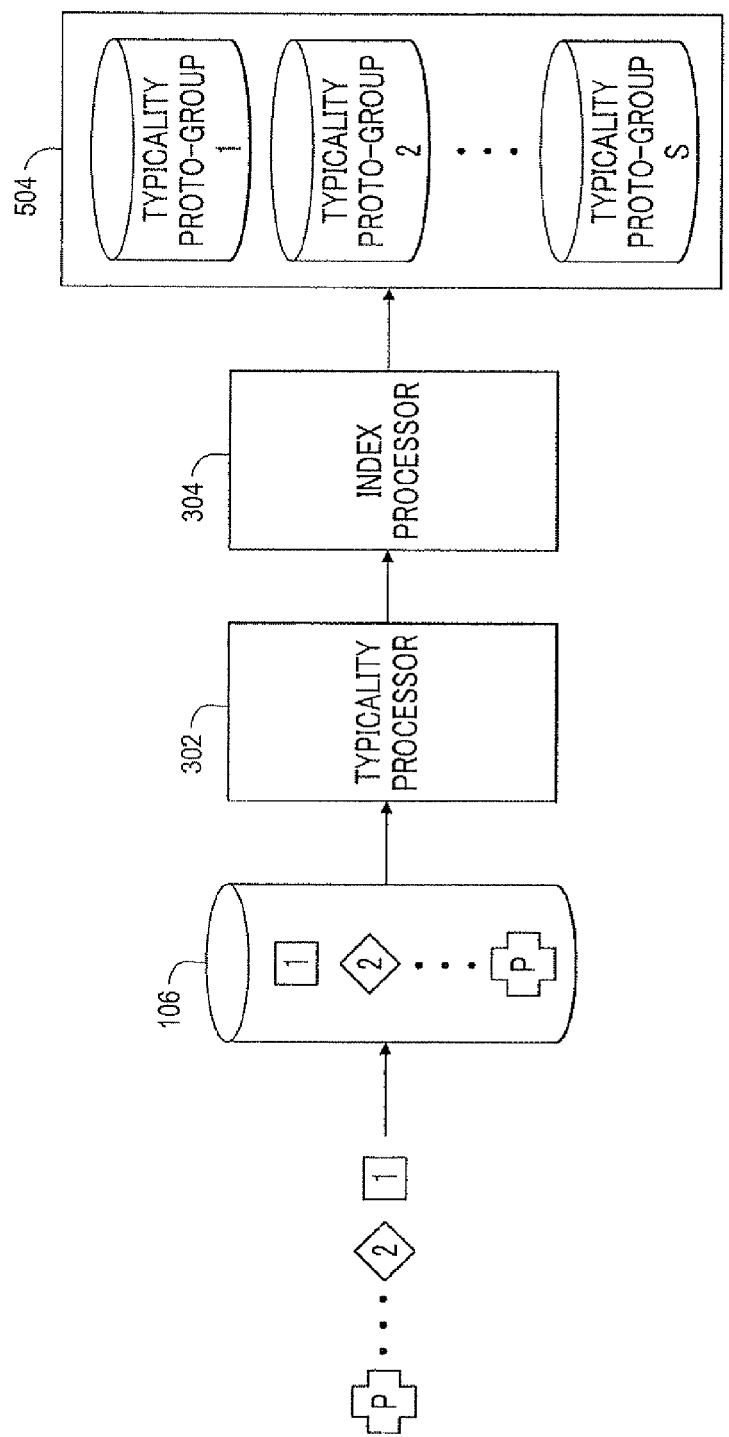
FIG. 5 illustrates indexing prototypes.
Figure 6:
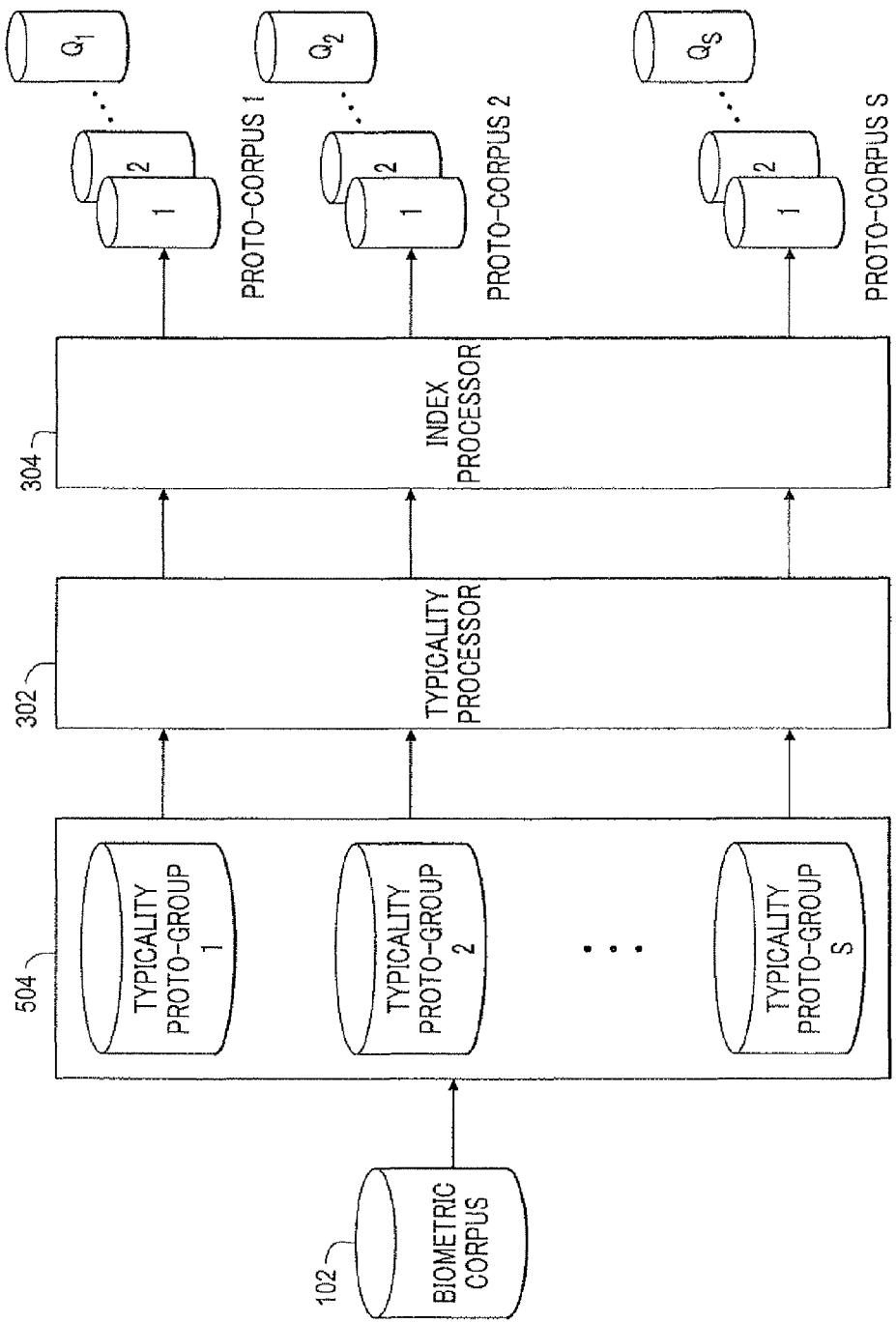
FIG. 6 illustrates spanning biometric corpus along prototype-typicality axes.
Figure 7:
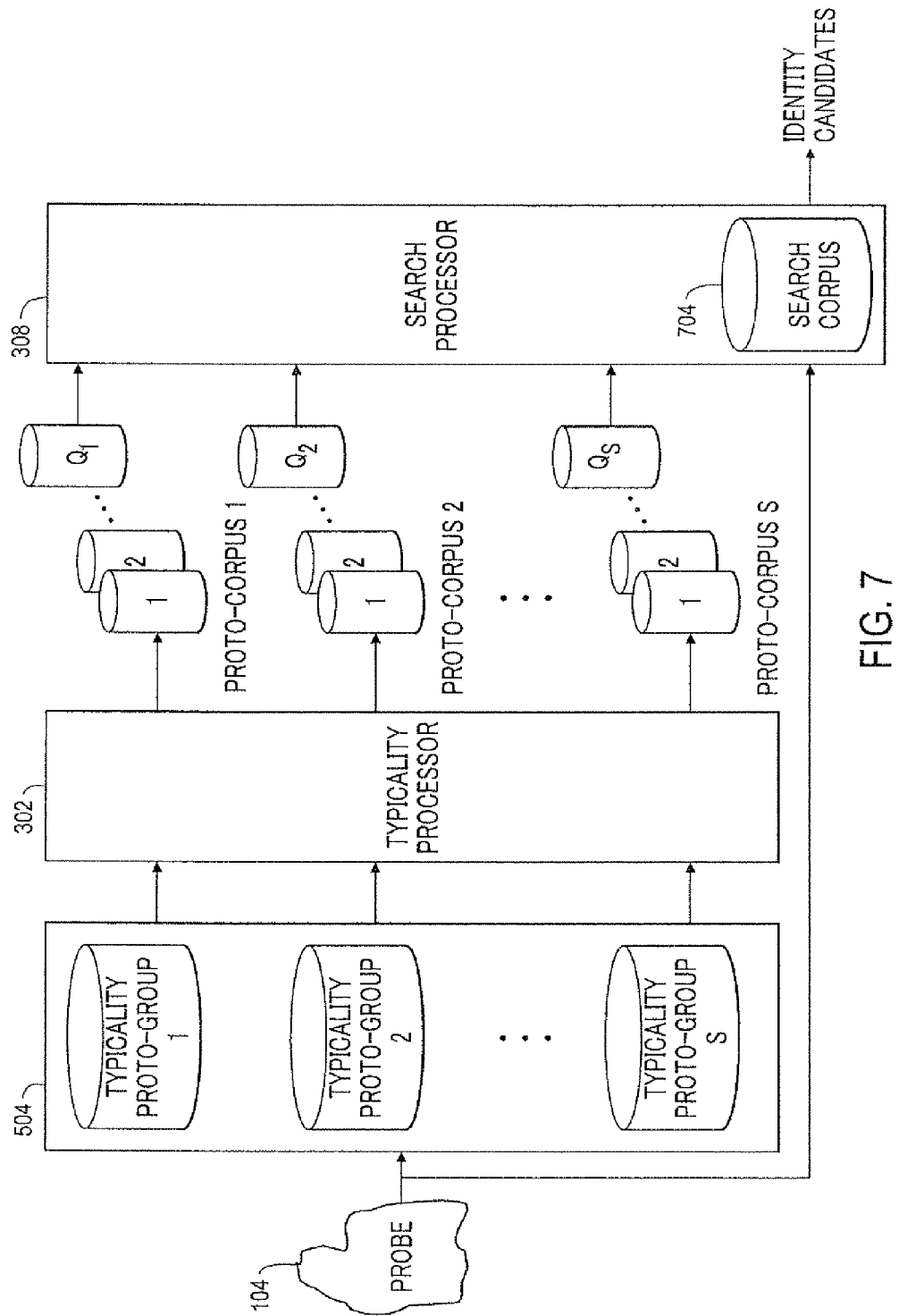
FIG. 7 illustrates generating a search corpus using prototype axes coordinates.

In FIGS. 5-7, instead of indexing biometric corpus 102 based on template-typicality scores, biometric processor 100 indexes biometric corpus 102 by creating prototype-typicality axes that indexes biometric corpus 102 multi-dimensionally using typicality scores of prototypes 106. As shown in FIG. 5, biometric processor 100 performs the matching operation between each of the prototypes 106 and other ones of prototypes 106 to obtain prototype-match scores. Typicality processor 302 generates P prototype-typicality scores one for each of prototypes 106 by averaging respective P prototype-match scores. An index processor 304 divides prototypes 106 into S typicality proto-groups 504 where each typicality proto-group corresponds to a prototype-typicality range and includes approximately a same number of prototypes 106 as other typicality proto-groups. S may be any integer value and preferably a small value such as 3, for example.

In FIG. 6, index processor 502 divides biometric corpus 102 into $Q_s$ proto-corpuses for each of S typicality proto-groups 504. Biometric processor 100 performs the matching operation between all the templates in biometric corpus 102 and prototypes of each of S typicality proto-groups 504 to obtain a set of template-match scores. Typicality processor 302 averages the set of template-match scores to generate a template-typicality score for each template. After typicality processor 302 generates the template-typicality scores for all the templates for each of typicality proto-groups 504, index processor 304 divides the template-typicality scores into the $Q_s$ template-typicality ranges. Each of the template-typicality ranges includes approximately a same number of corresponding templates of biometric corpus 102. This process is performed for all typicality proto-groups 504 to obtain S sets of the $Q_s$ proto-corpuses.

Typicality ranges for each of the S sets of proto-corpuses forms an axis for biometric corpus 102 because all the templates of biometric corpus 102 falls along the axis based on their template-typicality scores. Thus, when combined as orthogonal axes, template-typicality ranges of all S sets of proto-corpuses forms an S hyperspace that span biometric corpus 102. For S=3, biometric corpus 102 is spanned by 3 axes, each of the axes corresponding to one of 3 sets of proto-corpuses having coordinate values from 1 to $Q_s$ for s=1, 2 and 3. A search corpus is constructed based on a probe-typicality score of probe 104 for each of the axes spanning biometric corpus 102.

In FIG. 7, biometric processor 100 performs the matching function between probe 104 and all prototypes of each typicality proto-groups 504 to obtain S sets of probe-match scores. Typicality processor 302 averages each set of probe-match scores corresponding to each of the typicality proto-groups 504 to obtain S probe-typicality scores. Search processor 308 constructs a search corpus 704 by selecting one of the sets of proto-corpuses corresponding to each of the typicality proto-groups 504 based on the probe-typicality score of probe 104 to obtain S selected proto-corpuses. Then, search processor 308 places into search corpus 704 templates that are in all of the S selected proto-corpuses. Thus, search corpus 704 is a template intersection of all selected proto-corpuses.

In Euclidean terminology, search corpus 704 is a hyper-cube addressed by the probe-typicality scores of probe 104 in biometric corpus template space as spanned by the axes (template ranges) of the S proto-corpuses. As before, if greater inclusiveness is desired, proto-corpuses having adjacent typicality ranges may be included.

Figure 8:
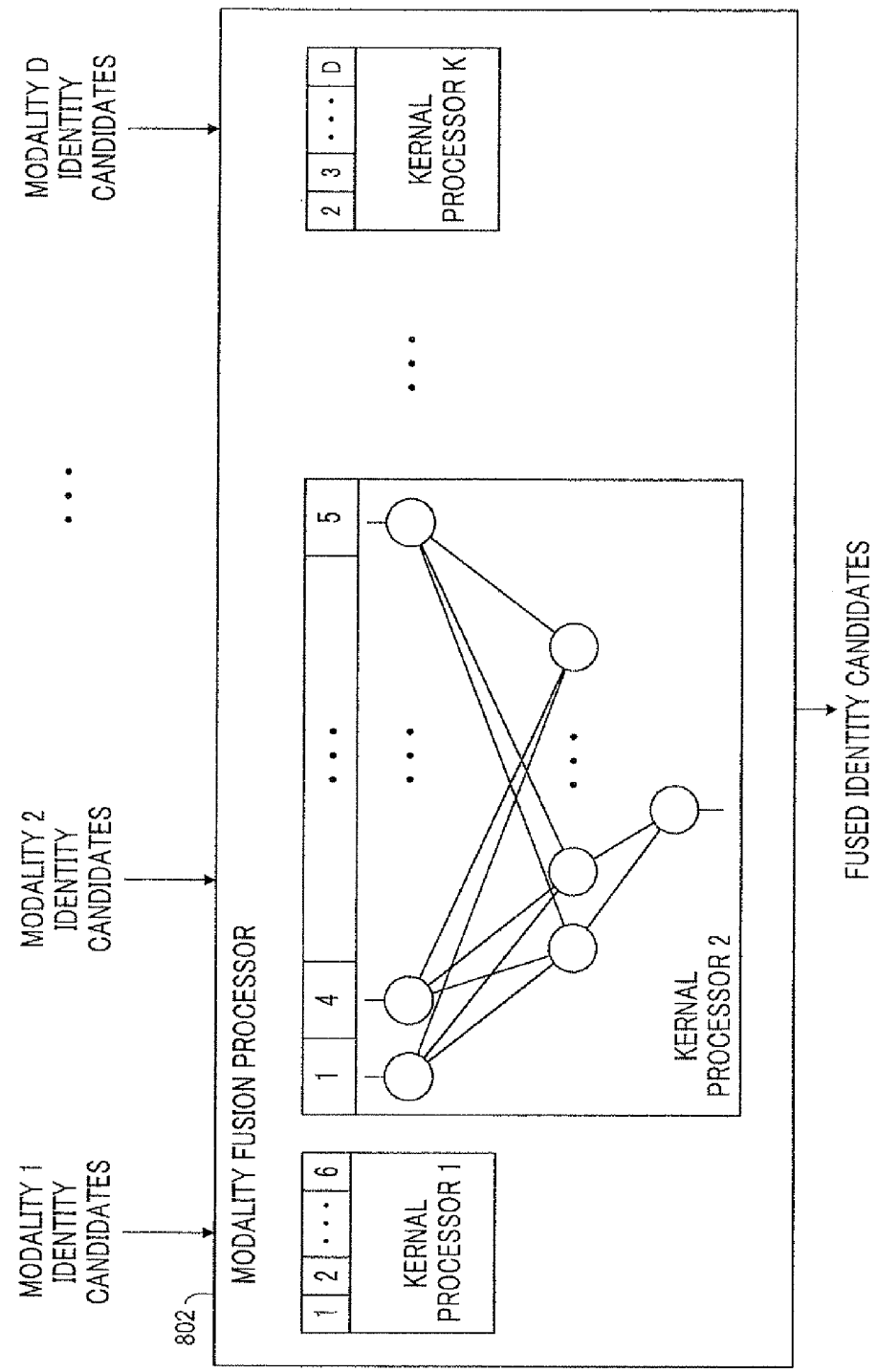
FIG. 8 illustrates a block diagram of a modality fusion processor.

FIG. 8 shows a modality fusion processor 802 that includes 1, 2, ... K kernel processors. The kernel processors are trained to process a specific combination of modalities for each identity candidate. Processes such as artificial neural networks (ANN) may be used as shown for kernel processor 2, as an example. The circles represent neurons and connecting lines represent neural connections. Each of the connections has an associated weight. As discussed earlier, biometric processor 100 indexes and searches for probe 104 in biometric corpus 102 one modality at a time so that the modalities are searched independently. Although theoretical relationships among modalities may be derived through DNA analysis, for example, experience provides practical guidance in fusing identity candidates from different modalities together to provide fused identity candidates.

The combination of modalities for each of the kernel processors is set through experience. Each kernel processor generates a fusion score for each of the identity candidates based on trained weights assigned to each of its modalities. The weights are set through training using biometric data of known probes. Modality fusion processor 802 selects identity candidates corresponding to fusion scores that exceed a threshold as fused identity candidates.

For an ANN example, assume that a kernel processor fuses 3 modalities, and the identity candidates are as follows:

TABLE 1

|   | Modality 1 | Modality 2 | Modality 3 |
|---|---|---|---|
| 1 | A | A |   |
| 2 | B |   | B |
| 3 |   | C | C |
| 4 | D | D |   |

As shown in Table 1 above, there are 4 identity candidates. Modality 1 has identity candidates A, B and D, modality 2 has identity candidates A, C and D, and modality 3 has identity candidates B and D. An ANN having 3 inputs, one for each modality is provided with one output. An input is a "1" if an identity has been identified for a modality, and a 0 if not identified for that modality. The kernel processor processes each identity candidate independently of other identity candidates. If an output for an identity candidate is a 1, then it is output as a fused identity candidate, but removed for an output of "0."

The ANN has weights that are associated with connections between neurons. For example, for an ANN having 3 input neurons, 2 intermediate neurons and a single output neuron, 11 weights may be used: one weight for each of the input neurons, 3 weights for each of the intermediate neurons and 2 weights for the output neuron. The weights may be initialized randomly and then automatically learned using a learning algorithm such as the back propagation algorithm for known training templates. See, e.g., Parallel Distributed Processing, David E. Rumelhart and James McClelland, Vols. 1 and 2, MIT press 1986.

The above ANN may be enhanced to provide confidence values instead of the single bit accept/remove result for each identity candidates. Confidence values may be generated by search processor 308 based on a position of an identity candidate among other templates in a search corpus. For example, search corpus 310 may output a higher confidence value for an identity candidate whose corresponding typicality score is closer to a center of a selected typicality range. If the typicality range was divided into a center, an intermediate and a peripheral regions having confidence values of 2, 1 and 0, respectively, search processor 308 may output 2 for typicality score of identity candidates that is within the center region of the selected typicality range. Similarly, if biometric corpus 102 is indexed by spanning biometric corpus 102 in an S dimension hyperspace, then a higher confidence value may be assigned to an identity candidate that has a candidate-typicality score that is within a center region of a selected hypercube, etc.

As noted above, for greater inclusiveness, templates having candidate-typicality scores that are adjacent to the selected typicality ranges or hypercubes may be also selected. These templates may be have still lower confidence values such as −1, −2, etc. as their distance from the selected typicality range or hypercube increases. Instead of having single bit inputs and output, the ANN may input multiple bit values. The output would also be a confidence value and a threshold may be set to accept identity candidates that meet or exceed the threshold as fused identity candidates.

Kernel processors may be microprocessors or application specific integrated circuits (ASICs) that perform the learning algorithm to set the weights. Once the weights are set, identity candidates for the specified modalities are processed to obtain the fused identity candidates.

Figure 9:
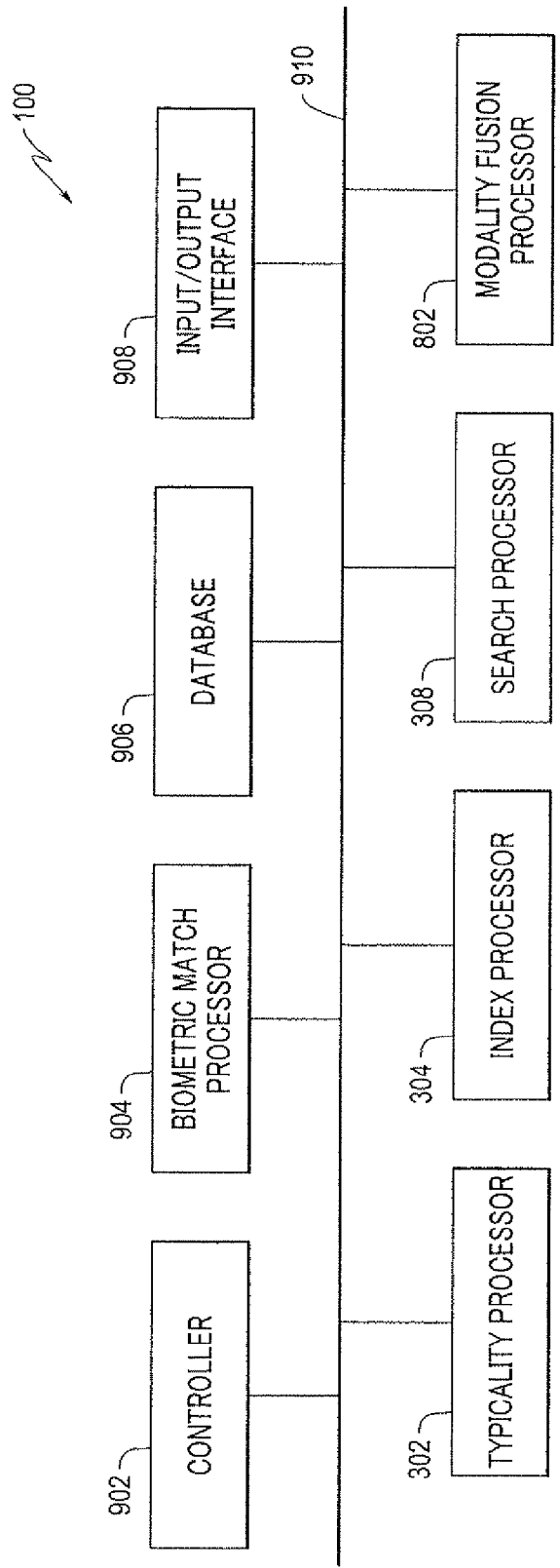
FIG. 9 illustrates a block diagram of a biometric identification apparatus.

FIG. 9 shows a block diagram of biometric processor 100 that includes a controller 902, a biometric match processor 904, a database 906, an input/output interface 908, typicality processor 302, index processor 304, search processor 308 and modality fusion processor 802. Components 902-908, 302, 304, 308 and 802 are coupled together through a signal bus 910. Although biometric processor 100 is illustrated using a bus architecture, any suitable architecture as dictated by specific circumstances are included. Also, wired, wireless, and/or optical networks such as intra-networks, peer-to-peer networks and/or the Internet may implement signal bus 910.

FIG. 9 shows biometric match processor 904 as a separate component. In the interest of speed, biometric match processor 904 may be implemented as an ASIC, for example. However, the functions performed by biometric match processor 904 may be performed by other components, i.e., controller 902, typicality processor 302, index processor 304 and search processor 308 by executing appropriate program steps. In the following discussion, controller 302, typicality processor 302, index processor 304 and search processor 308 are disclosed as performing the match operation.

Controller 902 performs general housekeeping tasks such as processing user commands. For example, a user through input/output interface 908 requests a search for probe 104, set up user parameters such as M1, M2, M3, the number of typicality-indexed sub-corpuses of adjacent typicality ranges to be searched, identify modalities to be processed, the matching process for each of the identified modalities, etc. Controller 902 sets up access to biometric corpus 102 if identified by the user as only available externally to biometric processor 100, for example.

As noted above, biometric corpus 102 may be indexed prior to processing a search request. A user may identify templates to be used as prototypes 106, or controller 902 may be commanded to automatically identify prototypes 106 from biometric corpus 102. In any case, prototypes 106 may be stored in database 906. If prototypes 106 are already stored in a database external to biometric processor 100, controller 902 sets up access methods for ready access while performing indexing or searching tasks. In the discussion below, indexing and searching operations of biometric processor 100 are discussed with respect to a single modality. As noted above, identity candidates for multiple modalities are generated by independently searching each modality and then the identity candidates are fused together by modality fusion processor 802 to generate fused identity candidates.

If the user specifies indexing biometric corpus 100 using only match scores, controller 902, operating as an index processor, performs the matching process between all templates in biometric corpus 102 and prototypes 106 to obtain template-match scores, selects templates having top M1 template-match scores for each of prototypes 106 and stores the templates in database 906 as P prototype-indexed corpuses 202. Instead of copying templates, controller 902 may store in database 906 template identifications such as addresses of templates, so that when needed, template data may be accessed from biometric corpus 102 through input/output interface 908 using the addresses stored in database 906.

When searching, controller 902 performs the matching process between probe 104 and prototypes 106 to obtain probe-match scores, and search processor 308 selects ones of prototype-indexed corpuses 202 corresponding to top M2 probe-match scores as a search corpus. Controller 902 performs the matching process between probe 104 and templates in the search corpus to obtain candidate-match scores. Search processor 308 selects templates having top M3 candidate-match scores as identity candidates.

If the user specifies indexing biometric corpus 100 using typicality scores to generate typicality-indexed corpus 306, typicality processor 302 performs the matching process between the templates in biometric corpus 104 and prototypes 106 to obtain template-match scores. Then, typicality processor 302 averages the template-match scores of each template to obtain template-typicality scores. Index processor 304 orders the templates into a typicality range order based on the template-typicality scores to generate typicality-indexed corpus 306. Typicality-indexed corpus 306 may be stored in database 906 as either the templates themselves or their addresses, for example.

When searching, typicality processor 302 performs the matching process between probe 104 and prototypes 106 to obtain probe-match scores, and averages the probe-match scores to generate a probe-typicality score. Search processor 308 places in search corpus 310 templates from typicality-indexed corpus 306 that correspond to a typicality range encompassing the probe-typicality score. Search processor 308 performs the matching process between probe 104 and templates in search corpus 310 to obtain candidate-match scores, and selects templates having top M3 candidate-match scores as identity candidates.

If the user specifies indexing biometric corpus 102 by creating the S hyperspace that span biometric corpus 102, Typicality processor 302 begins the indexing process by performing the matching operation between each of prototypes 106 and other ones of prototypes 106 to generate prototype-match scores. Then, typicality processor 302 averages the prototype-match scores for each prototype to generate prototype-typicality scores, and index processor 304 indexes prototypes 106 into typicality proto-groups 504 based on the prototype-typicality scores. Proto groups 504 define the S axes that span biometric corpus 102.

Then, typicality processor 302 performs the matching operation between the templates in biometric corpus 102 and each of the typicality proto-groups 504 to generate template-match scores, and averages the template-match scores to generate template-typicality scores for each of typicality proto-groups 504. Biometric corpus 102 is spanned by index processor 304 indexing biometric corpus 102 into proto-corpuses for each of the typicality proto-groups based on ranges of the template-typicality scores. Thus, biometric corpus 102 is spanned as proto-corpuses for each axis.

When searching, typicality processor 302 performs the matching operation between probe 104 and prototypes in each of typicality proto-groups 504 to generate probe-match scores, and averages the probe-match scores to generate a probe-typicality score for each of the typicality proto-groups 504. Search processor 308 selects ones of proto-corpuses corresponding to each of the typicality proto-groups that has a typicality range that encompass the probe-typicality score. Templates that are in all the selected proto-corpuses are placed in search corpus 704. Finally, search processor 308 searches for probe 104 by performing the matching operation between probe 104 and templates in search corpus 704 to obtain candidate-match scores, and selects templates corresponding to top M3 candidate-match scores as identify candidates.

After identity candidates for all available modalities of probe 104 are selected, modality fusion processor 802 fuses the multi-modality identity candidates by fusion processing these candidates using kernel processors for each set of modality combinations. The fusion processing may be ANN connection processing, for example. As discussed above, prior to fusion processing, kernel processors are trained using training templates. Thus, when identity candidates are ready for processing, modality fusion processor 802 performs fusion processing using trained weights to produce either accept/remove outputs or confidence values for each of the identity candidates resulting in a list of fused identity candidates.

Figure 10:
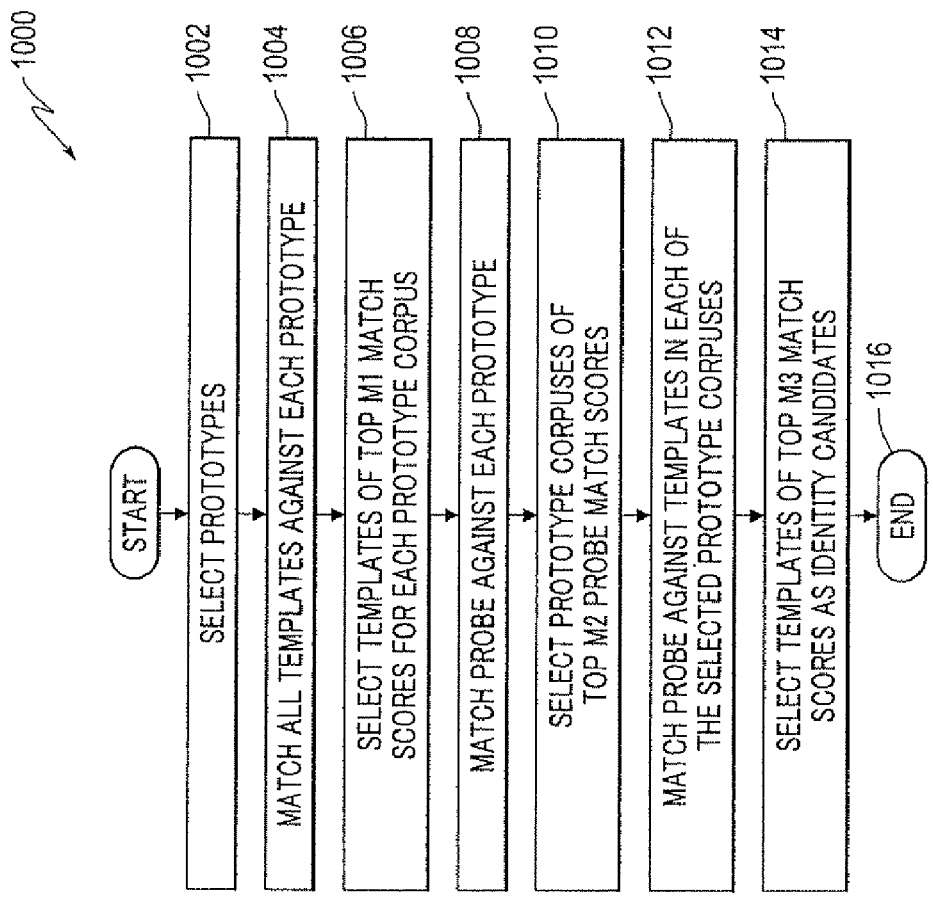
FIG. 10 illustrates a flowchart of a process for biometric identification using prototype matching.

FIG. 10 shows an exemplary flowchart 1000 of a process for biometric identification using prototype matching. In step 1002, the process selects prototypes 106, and goes to step 1004. As discussed above, any preferred process such as random selection may be used, for example. In step 1004, the process performs a matching operation between all templates in biometric corpus 102 and each of prototypes 106 to generate template-match scores, and goes to step 1006. In step 1006, the process selects templates having top M1 template-match scores for each of prototypes 106 as prototype corpuses 202, and goes to step 1008. In step 1008, probe 104 is matched against each of prototypes 106 to generate probe-match scores, and goes to step 1010. In step 1010, the process selects ones of prototype corpuses 202 that correspond to top M2 probe-match scores as a search corpus, and goes to step 1012. In step 1012, the process performs the matching operation between probe 104 and the search corpus to generate candidate-match scores, and goes to step 1014. In step 1014, the process selects templates corresponding to top M3 candidate-match scores as identity templates, goes to step 1016, and ends.

Figure 11:
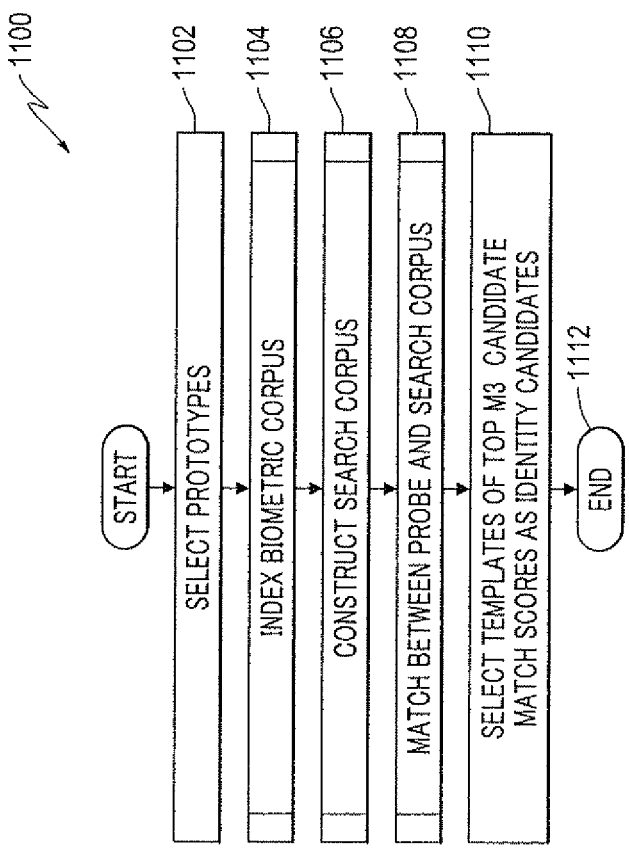
FIG. 11 illustrates a flowchart of a process for biometric identification using typicality scores.

FIG. 11 shows an exemplary flowchart of a top level process of biometric identification using typicality scores. In step 1102, the process selects prototypes 106, and goes to step 1104. In step 1104, the process indexes biometric corpus 102 and goes to step 1106. In step 1106, the process constructs a search corpus, and goes to step 1108. In step 1108, the process performs a matching operation between probe 104 and templates in the search corpus to obtain candidate-match scores, and goes to step 1110. In step 1110, the process selects templates corresponding to top M3 candidate-match scores as identity candidates, goes to step 1112 and ends.

Figure 12:
FIG. 12 illustrates a flowchart of a process for indexing a biometric corpus based on typicality scores.

FIG. 12 is an exemplary flowchart 1200 of a process for step 1104 of flowchart 1100 that generates a typicality-indexed corpus 306. In step 1202, the process performs the matching operation between templates in biometric corpus 102 and each of prototypes 106 to obtain template-match scores, and goes to step 1204. In step 1204, the process averages the template-match scores to obtain template-typicality scores, and goes to step 1206. In step 1206, the process indexes prototypes 106 based on typicality ranges of the template-typicality scores, and goes to step 1208. In step 1208, the process generates typicality-indexed corpus 306 by ordering the templates in biometric corpus 102 according to the typicality ranges, goes to step 1210, and returns to step 1106 of flowchart 1100.

Figure 13:
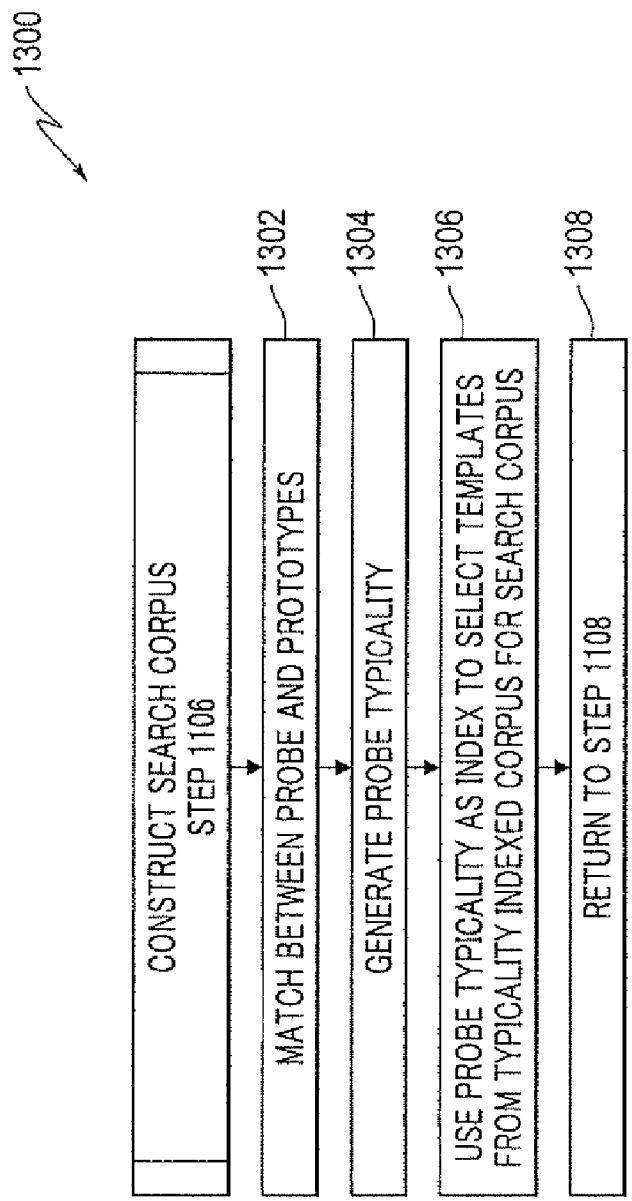
FIG. 13 illustrates a flowchart of a process for generating a search corpus based on a typicality-indexed biometric corpus.

FIG. 13 shows an exemplary flowchart 1300 of a process for step 1106 of flowchart 1100 that constructs search corpus 310. In step 1302, the process performs the matching operation between probe 104 and prototypes 106 to generate probe-match scores, and goes to step 1304. In step 1304, the process averages the probe-match scores to generate a probe-typicality score, and goes to step 1306. In step 1306, the process selects templates from typicality-indexed corpus 306 based on the probe-typicality score, places selected templates in search corpus 310, goes to step 1308, and returns to step 1108 of flowchart 1100.

Figure 14:
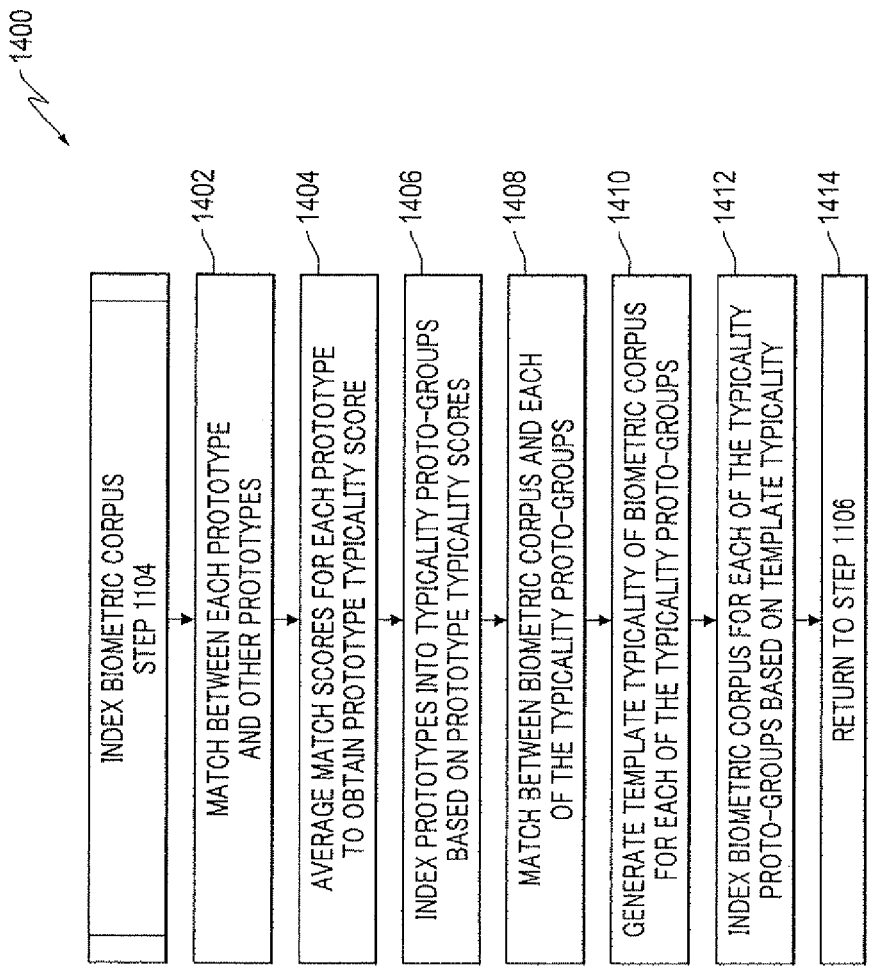
FIG. 14 illustrates a flowchart of a process for spanning a biometric corpus based on prototype-typicality scores.

FIG. 14 shows an exemplary flowchart 1400 of a process for step 1104 of flowchart 1100 that indexes biometric corpus 102 by creating an S hyperspace. In step 1402, the process performs the matching operation between each of prototypes 106 and other ones of prototypes 106 to generate prototype-match scores, and goes to step 1404. In step 1404, the process averages the prototype-match scores to obtain prototype-typicality scores, and goes to step 1406. In step 1406, the process indexes prototypes 106 into S typicality proto-groups 504 based on the prototype-typicality scores, and goes to step 1408.

In step 1408, the process performs the matching operation between the templates in biometric corpus 102 and prototypes in each of the S typicality proto-groups 504 to generate template-match scores, and goes to step 1410. In step 1410, the process averages the template-match scores to generate template-typicality scores for each of S typicality proto-groups 504, and goes to step 1412. In step 1412, the process indexes biometric corpus 102 for each of S typicality proto-groups 504 based on corresponding template-typicality scores to generate S sets of proto-corpuses based on typicality ranges of the template-typicality scores, goes to step 1414, and returns to step 1106 of flowchart 1100.

Figure 15:
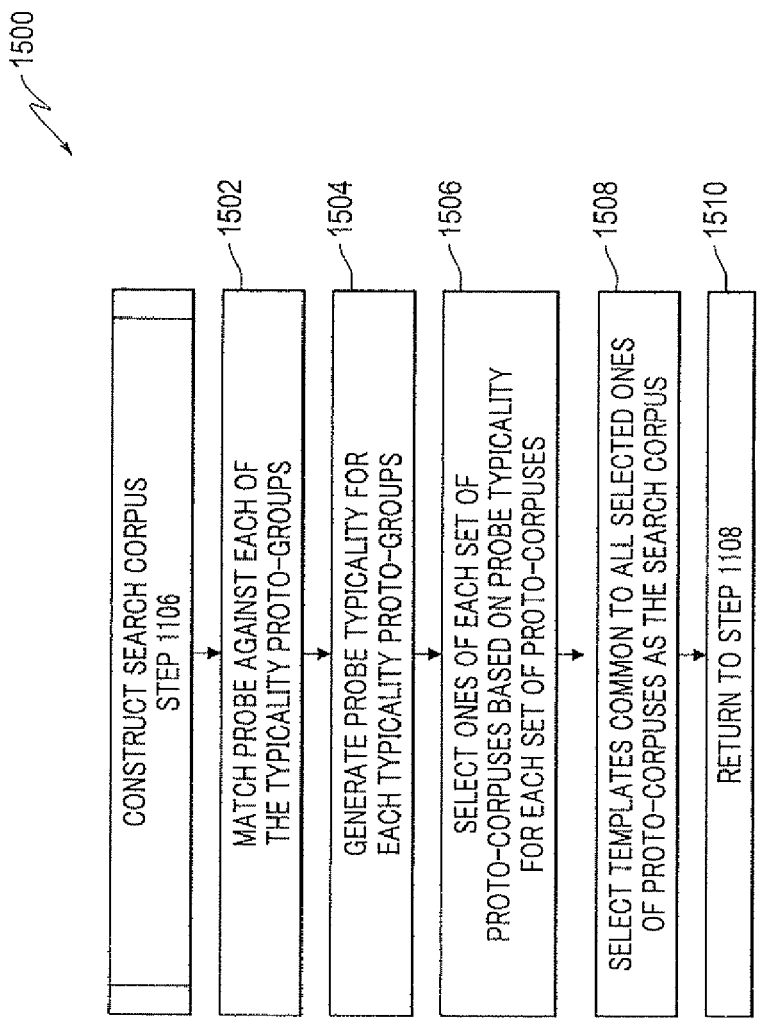
FIG. 15 illustrates a flowchart of a process for generating a search corpus based on prototype-typicality spanned biometric corpus.

FIG. 15 shows an exemplary flowchart 1500 of a process for step 1106 of flowchart 1100 that constructs search corpus 704. In step 1502, the process performs the matching operation between probe 104 and prototypes in each of S typicality proto-groups 504 to generate S sets of probe-match scores, and goes to step 1504. In step 1504, the process averages the probe-match scores in each of the S sets to generate a probe-typicality score for each of S typicality proto-groups 504, and goes to step 1506. In step 1506, the process selects a proto-corpus from each set of the S proto-corpuses based on the probe-typicality score for the corresponding one of S typicality proto-groups 504, and goes to step 1508. In step 1508, the process places templates that are common to all selected ones of the proto-corpuses into search corpus 704, goes to step 1510, and returns to step 1108 of flowchart 1100.

Figure 16:
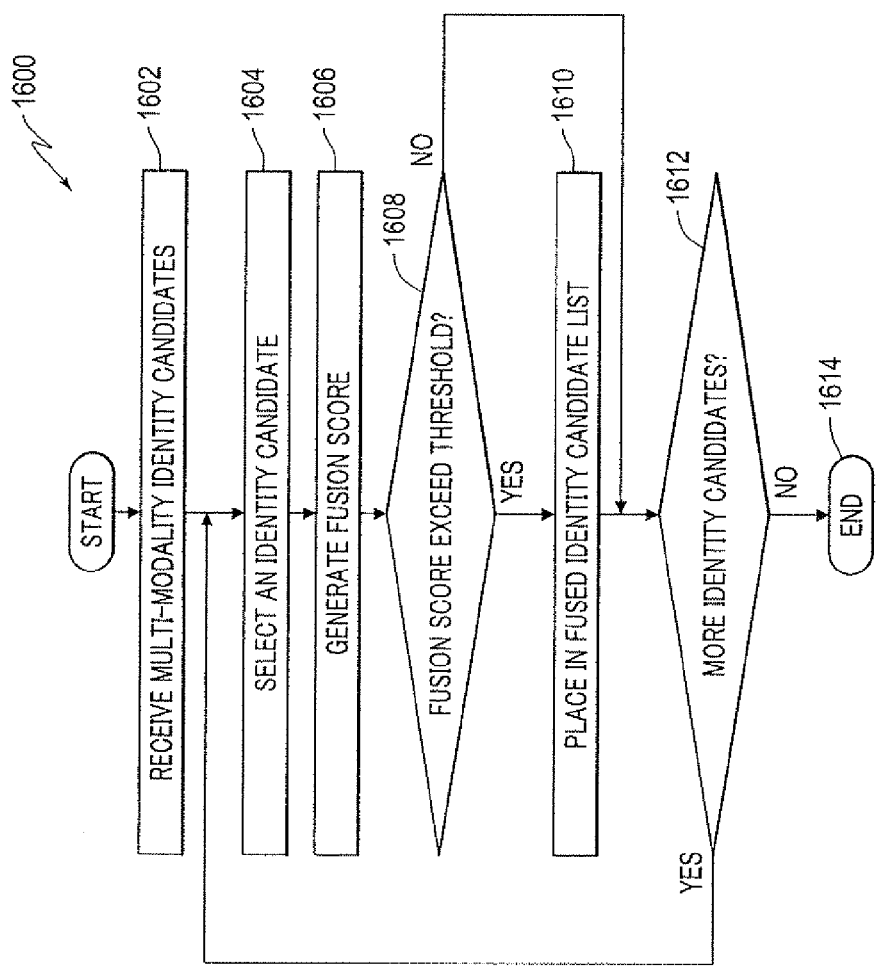
FIG. 16 illustrates a flowchart of a process for fusing identity candidates of multiple modalities.

FIG. 16 shows an exemplary flowchart 1600 of a process for fusing identity candidates. In step 1602, the process receives multi-modality identity candidates, and goes to step 1604. In step 1604, the process selects one of the identity candidates, and goes to step 1606. In step 1606, the process generates a fusion score for the selected identity candidate, and goes to step 1608. The process may generate the fusion score by weighing the presence or absence of the selected identity candidate in each of the considered modalities, a confidence value of the selected identity candidate for each of the modalities, etc. For example, an ANN may be used to input the presence/absence or confidence value and output an accept/remove or confidence value as a fusion score, as discussed above. In step 1608, the process determines whether the fusion score of the identity candidate exceed a threshold. If the threshold is exceeded, then the process goes to step 1610. Otherwise, if the threshold is not exceeded, the process goes to step 1612. In step 1610, the process places the identity candidate in a fused identity candidate list, and goes to step 1612. In step 1612, the process determines whether there is any identity candidate that remains to be fused. If there is an identity candidate that remains to be fused, the process returns to step 1604. Otherwise, no identity candidate remains to be fused, the process goes to step 1614, and ends.

Although the invention has been described in conjunction with the specific exemplary embodiments thereof, it is evident that many alternatives, modifications, and variations will be apparent to those skilled in the art. Accordingly, exemplary embodiments of the invention as set forth herein are intended to be illustrative, not limiting. There are changes that may be made without departing from the spirit and scope of the invention.

What is claimed is:

1. A biometric index and search apparatus that searches, based on a matching operation, for a probe in a biometric corpus stored in a database, comprising:
   a plurality of prototype templates;
   an index processor coupled to the database;
   a search processor coupled to the index processor and the database; and
   a typicality processor coupled to the index processor, the search processor, and the database, wherein:
   the typicality processor performs the matching operation between templates in the biometric corpus and the prototype templates, and averages resulting match scores for each of the templates to generate a template-typicality score for each of the templates; and
   the index processor generates a typicality-indexed corpus from the biometric corpus by dividing template-typicality scores of all the templates in the biometric corpus into typicality ranges, each typicality range corresponding to a typicality sub-corpus that has about a same number of templates as other typicality sub-corpuses, and each of templates in the typicality sub-corpus having a template-typicality score within a typicality range of the typicality sub-corpus.

2. The apparatus of claim 1, wherein:
   the typicality processor performs the matching operation between the probe and the prototype templates to generate probe-match scores, and averages the probe-match scores to generate a probe-typicality score; and
   the search processor selects a typicality sub-corpus based on the probe-typicality score as the search corpus.

3. A biometric index and search apparatus that searches, based on a matching operation, for a probe in a biometric corpus stored in a database, comprising:
   a plurality of prototype templates;
   an index processor coupled to the database;
   a search processor coupled to the index processor and the database; and a typicality processor coupled to the index processor, the search processor, and the database, wherein:

the typicality processer performs the matching operation between each of the prototype templates and all other ones of the prototype templates to generate prototype-match scores, and averages the prototype-match scores for each of the prototype templates to generate a prototype-typicality score for each of the prototype templates; and the index processor generates typicality proto-groups of the prototype templates by dividing prototype-typicality scores of all the prototype templates into P number of prototype-typicality ranges, each of the prototype-typicality ranges corresponding to one of the typicality proto-groups that has about a same number of prototype templates as other ones of the typicality proto-groups, prototype templates in each of the typicality proto-groups having a prototype-typicality score within a prototype-typicality range corresponding to each of the typicality proto-groups.

4. The apparatus of claim 3, wherein the typicality processor:

performs the matching operation between all the templates in the biometric corpus and all prototype templates in each of the typicality proto-groups to generate template-match scores, and averages the template-match scores to generate template-typicality scores for each of the typicality proto-groups;

the index processor divides the biometric corpus into a set of proto-corpuses for each of the typicality proto-groups based on the template-typicality scores of each of the typicality proto-groups.

5. The apparatus of claim 4, wherein the index processor divides the template-typicality scores of each of the typicality proto-groups into Q number of template-typicality ranges, each of the template-typicality ranges corresponding to one proto-corpus of the set of proto-corpuses, each of templates in the one proto-corpus having a template-typicality score within a template-typicality range corresponding to the one proto-corpus, each proto-corpus of the set of the proto-corpuses having about a same number of templates as other ones of the set of proto-corpuses.

6. The apparatus of claim 5, wherein the search processor:

performs the matching operation between the probe and prototype templates of each of the typicality proto-groups to generate probe-match scores;

averages the probe-match scores to generate a probe-typicality score;

selects a proto-corpus from each set of proto-corpuses based on the probe-typicality score corresponding to the set of proto-corpuses; and places templates that are in all selected proto-corpuses to form the search corpus.

7. A method for biometric indexing and searching based on a matching operation, for a probe in a biometric corpus comprising:

performing the matching operation between templates in the biometric corpus and prototype templates to obtain template-match scores;

averaging the template-match scores for each of a plurality of templates to generate a template-typicality score; and dividing template-typicality scores of all the templates in the biometric corpus into typicality ranges, each typicality range corresponding to a typicality sub-corpus of a typicality-indexed corpus that has about a same number of templates as other typicality sub-corpuses corresponding to other typicality ranges, and each of templates in the typicality sub-corpus having a template-typicality score within a typicality range of the typicality sub-corpus.

8. The method of claim 7 further comprising:

performing the matching operation between the probe and the prototype templates to generate probe-match scores;

averaging the probe-match scores to generate a probe-typicality score; and selecting a typicality sub-corpus based on the probe-typicality score as the search corpus.

9. A method for biometric indexing and searching based on a matching operation, for a probe in a biometric corpus comprising:

performing the matching operation between each of a plurality of prototype templates and all other ones of the prototype templates to generate prototype-match scores;

averaging the prototype-match scores for each of the prototype templates to generate a prototype-typicality score for each of the prototype templates; and dividing prototype-typicality scores of all the prototype templates into P number of prototype-typicality ranges to generate typicality proto-groups, each of the prototype-typicality ranges corresponding to one of the typicality proto-groups that has about a same number of prototype templates as other ones of the typicality proto-groups, prototype templates in each of the typicality proto-groups having a prototype-typicality score within a prototype-typicality range corresponding to each of the typicality proto-groups.

10. The method of claim 9, further comprising:

performing the matching operation between all the templates in the biometric corpus and all prototype templates in each of the typicality proto-groups to generate template-match scores, and averages the template-match scores to generate template-typicality scores for each of the typicality proto-groups;

dividing the biometric corpus into a set of proto-corpuses for each of the typicality proto-groups based on the template-typicality scores of each of the typicality proto-groups.

11. The method of claim 10, further comprising:

dividing the template-typicality scores of each of the typicality proto-groups into Q number of template-typicality ranges, each of the template-typicality ranges corresponding to one proto-corpus of the set of proto-corpuses, each of templates in the one proto-corpus having a template-typicality score within a template-typicality range corresponding to the one proto-corpus, each proto-corpus of the set of the proto-corpuses having about a same number of templates as other ones of the set of proto-corpuses.

12. The method of claim 11, further comprising:

performing the matching operation between the probe and prototype templates of each of the typicality proto-groups to generate probe-match scores;

averaging the probe-match scores to generate a probe-typicality score;

selecting a proto-corpus from each set of proto-corpuses based on the probe-typicality score corresponding to the set of proto-corpuses; and placing templates that are in all selected proto-corpuses to form the search corpus.

* * * * *